US000001953H

(19) United States

(12) Statutory Invention Registration (10) Reg. No.: US H1953 H

Burckhartzmeyer et al. (43) Published: Apr. 3, 2001

(54) APPARATUS AND METHOD FOR PREPARING A HYDRAULIC WORK MACHINE FOR TOWING

(75) Inventors: Jerry J. Burckhartzmeyer, Peoria; Joseph E. Dezelan, Jr., Joliet; Bryan A. Vogt, Romeoville, all of IL (US)

(73) Assignee: Caterpillar Inc., Peoria, IL (US)

(21) Appl. No.: 09/173,358

(22) Filed: Oct. 15, 1998

(51) Int. Cl.[7] ..... F16D 31/00; B60T 8/18

(52) U.S. Cl. ..... 60/403; 303/224; 477/199

(58) Field of Search ..... 60/403, 405, 435, 60/368

(56) References Cited

U.S. PATENT DOCUMENTS

| | | | |
|---|---|---|---|
| 3,944,295 | 3/1976 | Lloyd et al. | 303/89 |
| 3,987,703 | 10/1976 | Latimer | 91/6 |
| 4,195,716 | 4/1980 | Wirt | 192/3 R |
| 4,392,415 | 7/1983 | Melocik | 91/461 |
| 4,509,406 | 4/1985 | Melocik | 91/453 |
| 4,576,418 | 3/1986 | Holzinger et al. | 303/71 |

*Primary Examiner*—Harold J. Tudor

(74) *Attorney, Agent, or Firm*—Steve D. Lundquist

(57) ABSTRACT

An apparatus and method for preparing a hydraulic work machine for towing in response to a dead engine condition. The apparatus includes a source of hydraulic fluid, a standby pump system hydraulically connected to the source, a plurality of pilot controls adapted for electrical activation by the standby pump system, and a hydraulic brake system. The apparatus also includes a supply valve connected to the pilot controls, and at least one lift cylinder connected to the supply valve and adapted to lift an implement on the work machine. The hydraulic brake system and the lift cylinder are enabled for hydraulic control in response to activation of the standby pump system.

22 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD FOR PREPARING A HYDRAULIC WORK MACHINE FOR TOWING

TECHNICAL FIELD

This invention relates generally to an apparatus and method for preparing a hydraulic work machine for towing and, more particularly, to an apparatus and method for raising a work implement and releasing a parking brake under dead engine conditions.

BACKGROUND ART

Hydraulic work machines, in particular mobile machines such as wheel loaders, tractors, scrapers, graders, and the like, are used extensively to perform work functions such as altering terrain, moving material, constructing roads, lots, runways, and repairing the same. Generally these hydraulic work machines have a power source, i.e., an engine, to move about, and this same power source is also used to power the hydraulic systems on the machine.

Occasionally, an engine will malfunction on a machine, thus disabling the machine from moving about, and also disabling the hydraulic systems. It is common for such a machine to use a spring applied, hydraulic pressure released brake system; that is, the brakes are always engaged by spring action until controlled hydraulic pressure to the brakes overcomes the spring force and releases the brakes. In a dead engine situation, the brakes will be engaged. If the machine is required to be towed, some means is needed to release the brakes for towing.

Several patents exist which disclose methods for releasing brakes for towing under dead engine conditions. For example, in U.S. Pat. No. 4,195,716, Wirt discloses a brake release mechanism for vehicle towing which uses a manual hydraulic pump means to manually pump fluid into the brake system and thus disengage the brakes for towing. Although the system disclosed by Wirt accomplishes the purpose of releasing the brakes, some significant effort is required by a human to perform this procedure. What is needed is a means to release the brakes for towing while minimizing the human effort required.

In addition to the need to release the brakes for towing under dead engine conditions, it often occurs that a work implement is in contact with the ground when the engine fails. In this situation, the implement would need to be raised above the ground to prepare the machine for towing. The hydraulic pressure required to raise an implement, particularly a heavy implement or an implement with a heavy load, would be tremendous. For example, a compactor/hammer mounted on a wheel loader may weigh in excess of 14,000 kg. Historically, an implement is raised for towing by either manually pumping hydraulic fluid into lift cylinders or by connecting a pump from a service vehicle to the disabled work machine and then pumping hydraulic fluid into the lift cylinders. In either case, it is desired to enable lifting of an implement for towing by some convenient means located within easy access to an operator, and without requiring the manual connection of some other system.

The present invention is directed to overcoming one or more of the problems as set forth above.

DISCLOSURE OF THE INVENTION

In one aspect of the present invention an apparatus for preparing a hydraulic work machine for towing in response to a dead engine condition is disclosed. The apparatus includes a source of hydraulic fluid, a standby pump system hydraulically connected to the source, a plurality of pilot controls adapted for electrical activation by the standby pump system, and a hydraulic brake system. The apparatus also includes a supply valve connected to the pilot controls, and at least one lift cylinder connected to the supply valve and adapted to lift an implement on the work machine. The hydraulic brake system and the lift cylinder are enabled for hydraulic control in response to activation of the standby pump system.

In another aspect of the present invention an apparatus for lifting an implement on a hydraulic work machine in response to a dead engine condition is disclosed. The apparatus includes a source of hydraulic fluid, a standby pump system hydraulically connected to the source, and a plurality of pilot controls adapted for electrical activation by the standby pump system. The apparatus also includes a supply valve connected to the pilot controls, and at least one lift cylinder connected to the supply valve and adapted to lift an implement on the work machine. The lift cylinder is enabled for hydraulic control in response to activation of the standby pump system.

In yet another aspect of the present invention an apparatus for releasing a set of hydraulically actuated brakes on a hydraulic work machine in response to a dead engine condition is disclosed. The apparatus includes a source of hydraulic fluid, a standby pump system hydraulically connected to the source, and a hydraulic brake system. The apparatus also includes a sequence valve adapted to controllably deliver hydraulic fluid to the hydraulic brake system. The hydraulic brake system is enabled for hydraulic control in response to activation of the standby pump system.

In yet another aspect of the present invention a method for preparing a hydraulic work machine for towing in response to a dead engine condition is disclosed. The method includes the steps of depressing a switch to activate a standby pump system, activating a motor in response to depressing the switch, activating a hydraulic pump in response to activating the motor, lifting an implement as a function of the switch being depressed and in response to engaging a hydraulic implement lift control lever, and releasing a set of brakes as a function of the switch being depressed and in response to engaging a brake release lever.

BEST MODE FOR CARRYING OUT THE INVENTION

Figure 1:
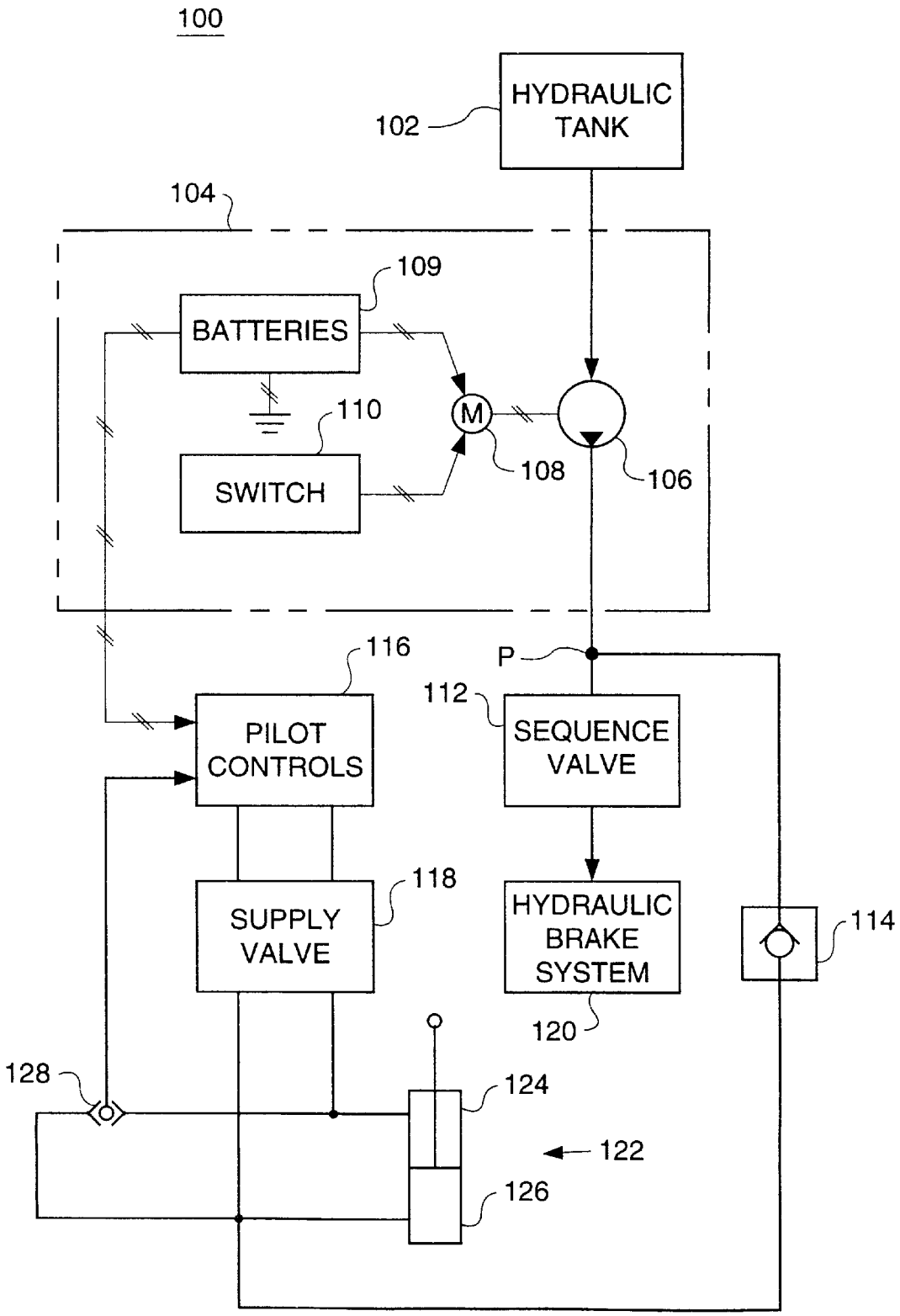
FIG. 1 is a diagrammatic illustration of an apparatus as embodied for use in one aspect of the present invention.

Referring to the drawings, and with particular reference to FIG. 1, an apparatus 100 for preparing a hydraulic work machine for towing in response to a dead engine condition is shown. Preferably, the hydraulic work machine is a mobile machine, such as a wheel loader, tractor, scraper, grader, dozer, and the like. The work machine, in the preferred embodiment, has a work implement, such as a bucket, blade, scraper, compactor, or other such implement designed to perform a work function.

In the preferred embodiment, the work machine has a power source, i.e., an engine, to provide power for the machine to move about, and to provide power for hydraulic systems used for various purposes, such as controlling the work implement or operating a set of brakes on the machine.

Occasionally, the engine will malfunction, and the machine will not be able to move on its own power. In addition, a malfunction of the engine will disable the hydraulic systems. In this situation, it may be required to tow the machine away from the work site.

The machine must be prepared for towing by hydraulically lifting the implement off the ground, and hydraulically disengaging the brakes.

In FIG. 1, solid lines with arrows depict hydraulic circuits, and solid lines with arrows and diagonal slashes indicate electrical circuits.

A hydraulic tank 102 located on the work machine provides a source of hydraulic fluid for the various hydraulic systems. Preferably, the hydraulic tank 102 provides fluid during normal operation and also during dead engine operation for use with the present invention.

A standby pump system 104, located on the work machine and hydraulically connected to the source of hydraulic fluid, provides pressurized hydraulic fluid to the hydraulic systems on the work machine in the event of a dead engine condition by means described below.

The standby pump system 104, in the preferred embodiment, includes a hydraulic pump 106, a motor 108 electrically connected to the pump 106, at least one battery 109 electrically connected to the motor 108, and a manual switch 110 electrically connected to the motor 108. The switch 110 is adapted to controllably activate the standby pump system 104. During activation of the switch 110, the battery 109 provides electrical power to the motor 108, which in turn drives the pump 106. The pump 106 then provides pressurized hydraulic fluid to select hydraulic systems located on the work machine.

In one embodiment, the battery 109 may be a single battery capable of supplying electrical power to the motor 108 for a desired period of time. However, a plurality of batteries 109 may be required and used to supply adequate electrical power.

In the preferred embodiment, the switch 110 is a spring loaded mechanism, activated only during the time it is held in an on position. For example, the switch 110 may be a push button type of switch that is engaged only when it is pushed, and is disengaged when it is released. An advantage of this type of switch is that the standby pump system 104 is only activated during time periods in which an operator intentionally holds the switch 110 in the on position. A configuration of this sort will prevent the standby pump system 104 from being engaged longer than desired.

In the preferred embodiment, the hydraulic systems on the work machine include a plurality of pilot controls 116 that are, preferably, electrohydraulic. The electrohydraulic pilot controls 116 are, in the present invention, adapted for electrical activation by the standby pump system 104 during those periods of time in which the switch 110 is engaged.

The work machine includes a hydraulic brake system 120. Typical hydraulic brake systems on work machines of the type used with reference to the present invention are spring loaded and hydraulically disengaged. That is, springs maintain the brakes in an engaged mode until the activation of hydraulic pressure overcomes the force of the springs and releases the brakes. In a dead engine situation, there is normally no hydraulic pressure available to release the brakes. This is normally desired to prevent the machine from moving should an engine failure occur, or to keep the machine from moving when the engine is shut off. However, if the machine is required to be towed, it is then desired to release the brakes by an alternate means, such as is discussed in the present invention.

In one embodiment of the present invention, the hydraulic brake system 120 referred to is a parking brake system. However, the present invention could be applied equally to the main hydraulic brake system on a machine.

A sequence valve 112 is hydraulically connected to the standby pump system 104 and is adapted to controllably deliver hydraulic fluid to the hydraulic brake system 120. In FIG. 1, the sequence valve 112 is designed to activate in response to the hydraulic pressure at a point P being at least a predetermined minimum value. This allows the standby pump system 104 to create hydraulic pressure adequate to lift a work implement before diverting hydraulic fluid to the hydraulic brake system 120.

Alternatively, the present invention may be designed to operate without a sequence valve. This embodiment would reduce the costs of the system with some sacrifice in the quality of operations of the invention.

A supply valve 118 hydraulically connected to the pilot controls 116 provides hydraulic fluid to at least one lift cylinder 122. The supply valve 118 also provides for the release of hydraulic fluid from the lift cylinder 122. For example, the supply valve 118 may supply hydraulic fluid to a head end 126 of the lift cylinder 122 and release fluid from a rod end 124 of the lift cylinder 122 to enable the lift cylinder 122 to lift an implement.

In the preferred embodiment, fluid is supplied to the head end 126 of the lift cylinder 122 by the standby pump system 104 through a check valve 114. The pilot controls 116, which operate the supply valve 118, are enabled hydraulically by pressure from the lift cylinder 122 via a resolver valve 128. The resolver valve 128 provides hydraulic pressure from either the head end 126 or the rod end 124, whichever is greater. As the pilot controls 116 operate the supply valve 118, hydraulic fluid is released from the rod end 124 of the lift cylinder 122, thus enabling fluid to enter the head end 126, which enables the lift cylinder 122 to lift the work implement.

It is assumed in the above discussion that fluid supplied to the head end 126 of the lift cylinder 122 causes the work implement to raise.

However, the present invention would function equally well if the lift cylinder 122 is configured to raise an implement by delivering hydraulic fluid to the rod end 124 instead. In addition, the present invention could be configured to supply hydraulic fluid to other hydraulic devices, for example a pitch cylinder, to enable operations of other hydraulic features on the machine.

It is common for a hydraulic work machine to have more than one lift cylinder to raise and lower an implement. For example, a typical wheel loader may have two lift cylinders, a right lift cylinder and a left lift cylinder. It is understood that, while discussion of the present invention may refer to a lift cylinder in the singular sense, application of the present invention would also include any number of lift cylinders on a hydraulic work machine.

The check valve 114 is preferably located on the hydraulic output of the standby pump system 104 to prevent hydraulic fluid from returning to the standby pump system 104.

In the preferred embodiment, portions of the apparatus 100 shown in FIG. 1 may be part of the hydraulic systems on the work machine under normal operating conditions. For example, the electrohydraulic pilot controls 116, the supply valve 118, the hydraulic brake system 120, and the lift cylinder 122 may all be part of the normal hydraulic systems on the machine. However, the above components are also adapted for use with the standby pump system 104 when needed.

Figure 2:
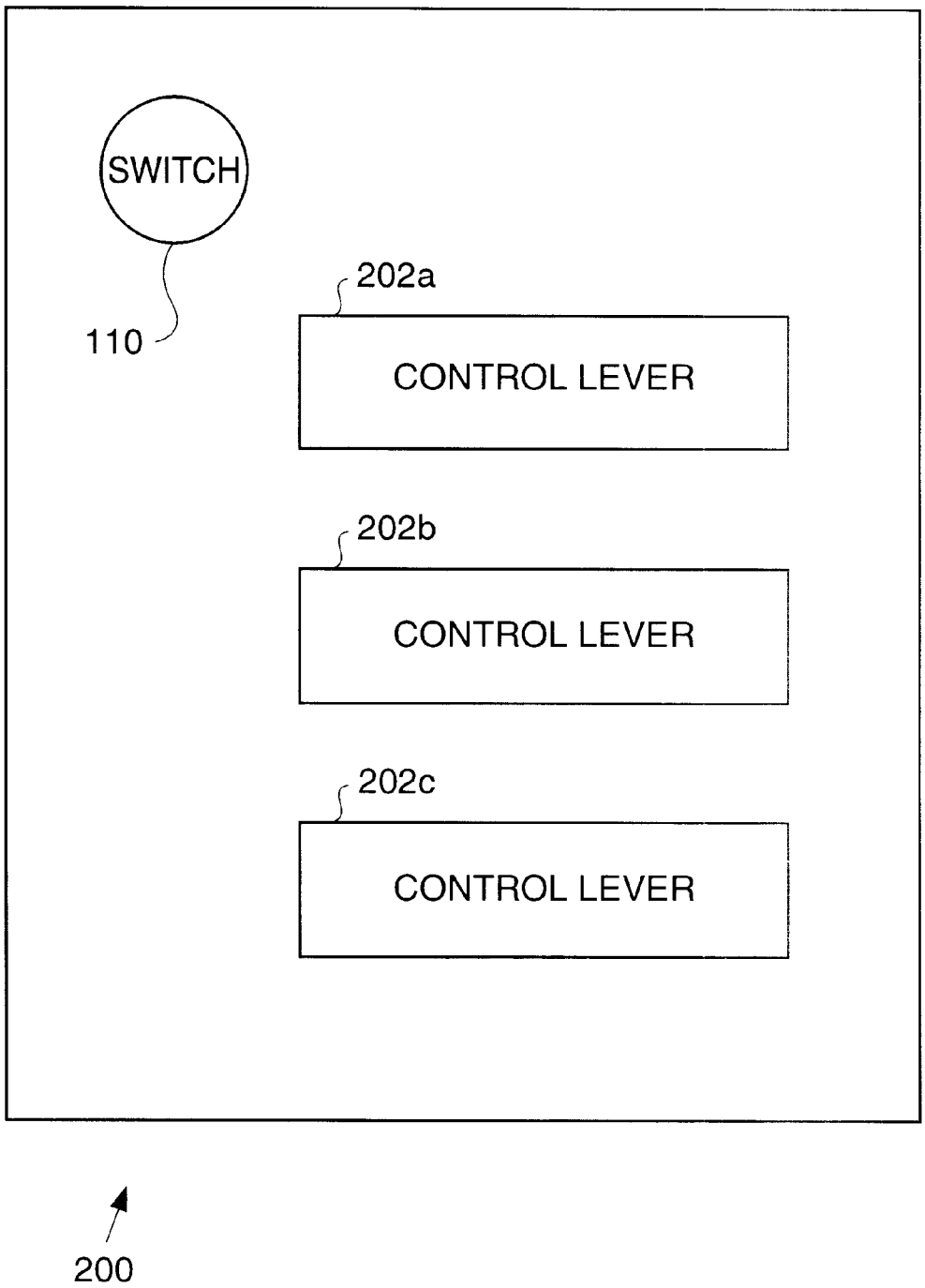
FIG. 2 is a diagrammatic illustration of a control panel as embodied for use in one aspect of the present invention.

Referring to FIG. 2, a diagrammatic illustration of a control panel 200 for use with one aspect of the present invention is shown. Preferably, the control panel 200 is located within easy access to an operator, e.g., within reach of an operator in the cab of the work machine. The control panel 200 includes the manual switch 110 for activation of the standby pump system 104 and the pilot controls 116.

The control panel 200 also includes at least one hydraulic control lever 202. Preferably, a hydraulic control lever 202 on the control panel 200 is an implement lift control lever. However, other hydraulic control levers could additionally be included. For example, FIG. 2 is shown having three hydraulic control levers 202*a,b,c*. Examples of additional control levers may include an implement tilt control lever, a brake release override lever, steering control levers, and any number of other hydraulic control levers as may be used on a hydraulic work machine. Additionally, the control panel 200 may include other controls and indicators used in operation of the work machine without deviating from the spirit of the present invention. Alternatively, the switch 110 and the hydraulic control levers 202 may not be located on a control panel, but may be incorporated in other locations on the work machine, e.g., on a dashboard, armrest, and the like.

Figure 3:
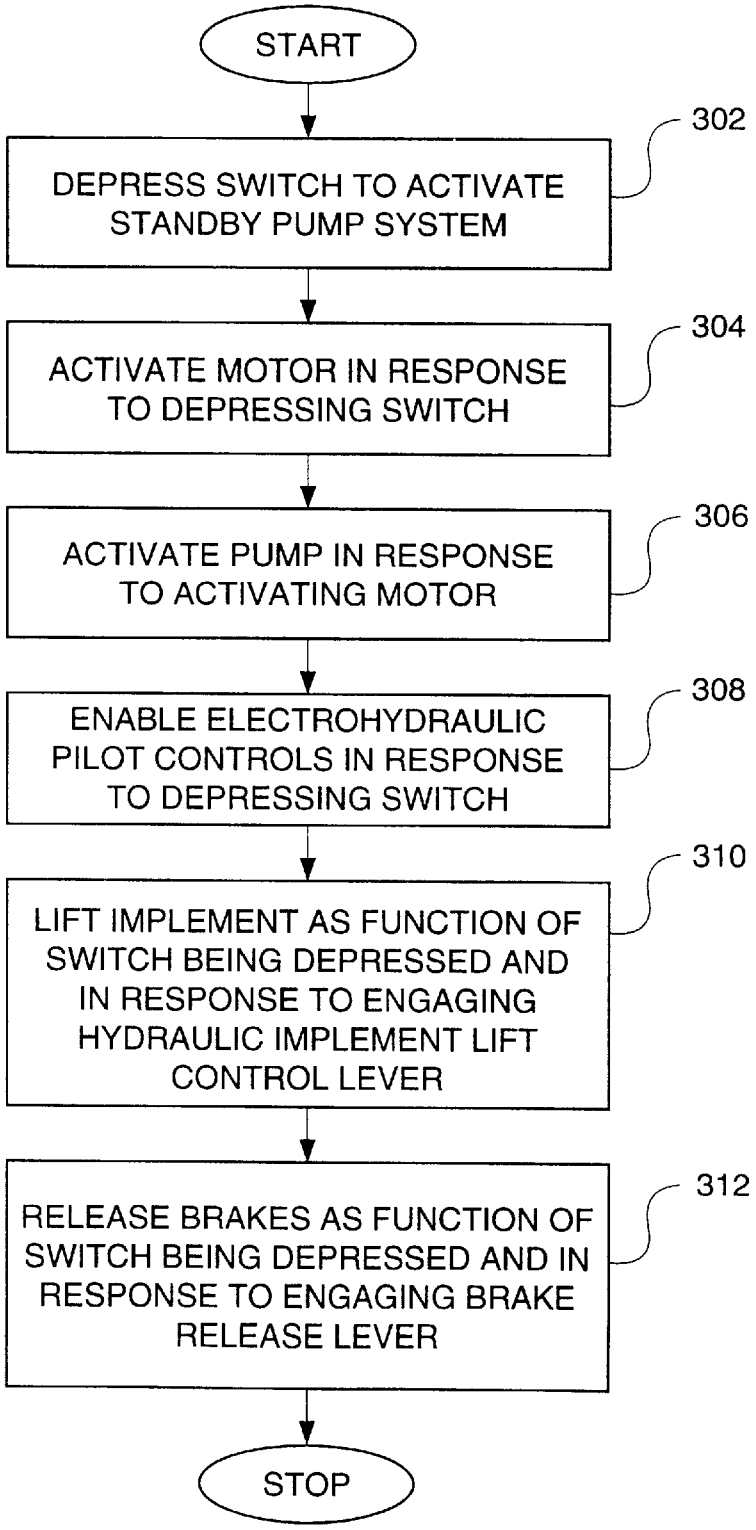
FIG. 3 is a flow diagram illustrating a method of the present invention.

Referring now to FIG. 3, a method for preparing a hydraulic work machine for towing in response to a dead engine condition is shown.

In a first control block 302, the switch 110 is pressed to activate the standby pump system 104 and to provide power from the battery 109 to the electrohydraulic pilot controls 116, as shown in a fourth control block 308.

In a second control block 304 the motor 108 is activated in response to pressing the switch 110, which in turn activates the pump 106 in a third control block 306.

Control then proceeds to a fifth control block 310, in which the implement is lifted as a function of the switch 110 being depressed and in response to engaging the hydraulic implement lift control lever 202. Preferably, the implement lift operation only takes place while both the switch 110 is depressed and the implement lift control lever 202 is activated.

In one aspect of the invention, the lift cylinder 122 performs a lifting operation on the implement when the hydraulic system delivers hydraulic fluid to the head end 126 of the lift cylinder 122 and releases hydraulic fluid from the rod end 124 of the lift cylinder 122.

In a sixth control block 312, the brakes are released as a function of the switch 110 being depressed and in response to engaging the brake release lever. Preferably, the brakes are released by delivering hydraulic fluid to the hydraulic brake system 120.

INDUSTRIAL APPLICABILITY

As an example of use of the present invention, a hydraulic work machine, e.g., a wheel loader, may become disabled at a work site due to a dead engine condition. It may be desired to tow the disabled machine away from the site to perform repairs at a more convenient location, and to remove the machine from the site so that another machine may continue operations.

However, the conditions of the brakes being applied and the work implement being lowered to the ground may impede towing. In addition, the work machine may have been operating in an environment too harsh or hostile for a human operator to exit the machine. For example, other machines may be working at the site and it is desirable for the operator to remain on his disabled machine.

The present invention is designed for an operator of a hydraulic work machine that is disabled due to a dead engine condition to be able to prepare the machine for towing, i.e., lift the implement and release the brakes, without leaving the cab of the machine.

Other aspects, objects, and features of the present invention can be obtained from a study of the drawings, the disclosure, and the appended claims.

What is claimed is:

1. An apparatus for preparing a hydraulic work machine for towing in response to a dead engine condition, comprising:

a source of hydraulic fluid located on the work machine;

a standby pump system located on the work machine and hydraulically connected to the source;

a plurality of electrohydraulic pilot controls adapted for electrical activation by the standby pump system;

a hydraulic brake system located on the work machine;

a supply valve hydraulically connected to the pilot controls; and at least one lift cylinder hydraulically connected to the supply valve and adapted to lift an implement on the work machine;

wherein the hydraulic brake system and the at least one lift cylinder are enabled for hydraulic control in response to activation of the standby pump system.

2. An apparatus, as set forth in claim 1, wherein the standby pump system includes:

a hydraulic pump;

a motor electrically connected to the pump;

at least one battery electrically connected to the motor; and a switch electrically connected to the motor and adapted to controllably activate the standby pump system.

3. An apparatus, as set forth in claim 1, further including a sequence valve hydraulically connected to the standby pump system and adapted to controllably deliver hydraulic fluid to the hydraulic brake system.

4. An apparatus, as set forth in claim 3, wherein the sequence valve is adapted to controllably deliver hydraulic fluid to the hydraulic brake system in response to the pressure of the hydraulic fluid from the standby pump system being at least a predetermined minimum value.

5. An apparatus, as set forth in claim 1, further including a resolver valve adapted to provide hydraulic pressure to the pilot controls from one of a head end and a rod end of the at least one lift cylinder.

6. An apparatus, as set forth in claim 2, wherein the switch is enabled in response to an operator holding the switch in an on position, and disabled in response to the operator releasing contact with the switch.

7. An apparatus, as set forth in claim 2, further including a control panel located on the hydraulic work machine, the control panel including the switch and at least one hydraulic control lever.

8. An apparatus, as set forth in claim 7, wherein one of the at least one hydraulic control lever is an implement lift control lever.

9. An apparatus, as set forth in claim 1, further including a check valve located on the hydraulic output of the standby pump system to prevent hydraulic fluid from returning to the pump system.

10. An apparatus for lifting an implement on a hydraulic work machine in response to a dead engine condition, comprising:

a source of hydraulic fluid located on the work machine;

a standby pump system located on the work machine and hydraulically connected to the source;

a plurality of electrohydraulic pilot controls adapted for electrical activation by the standby pump system;

a supply valve hydraulically connected to the pilot controls; and at least one lift cylinder hydraulically connected to the supply valve and adapted to lift an implement on the work machine;

wherein the at least one lift cylinder is enabled for hydraulic control in response to activation of the standby pump system.

11. An apparatus, as set forth in claim 10, wherein the standby pump system includes:

a hydraulic pump;

a motor electrically connected to the pump;

at least one battery electrically connected to the motor; and a switch electrically connected to the motor and adapted to controllably activate the standby pump system.

12. An apparatus, as set forth in claim 10, further including a resolver valve adapted to provide hydraulic pressure to the pilot controls from one of a head end and a rod end of the at least one lift cylinder.

13. An apparatus, as set forth in claim 11, wherein the switch is enabled in response to an operator holding the switch in an on position, and disabled in response to the operator releasing contact with the switch.

14. An apparatus, as set forth in claim 11, further including a control panel located on the hydraulic work machine, the control panel including the switch and at least one hydraulic control lever.

15. An apparatus, as set forth in claim 14, wherein one of the at least one hydraulic control lever is an implement lift control lever.

16. An apparatus for releasing a set of hydraulically actuated brakes on a hydraulic work machine in response to a dead engine condition, comprising:

a source of hydraulic fluid located on the work machine;

a standby pump system located on the work machine and hydraulically connected to the source;

a hydraulic brake system located on the work machine; and a sequence valve hydraulically connected to the standby pump system and adapted to controllably deliver hydraulic fluid to the hydraulic brake system;

wherein the hydraulic brake system is enabled for hydraulic control in response to activation of the standby pump system.

17. An apparatus, as set forth in claim 16, wherein the standby pump system includes:

a hydraulic pump;

a motor electrically connected to the pump;

at least one battery electrically connected to the motor; and a switch electrically connected to the motor and adapted to controllably activate the standby pump system.

18. An apparatus, as set forth in claim 16, wherein the sequence valve is adapted to controllably deliver hydraulic fluid to the hydraulic brake system in response to the pressure of the hydraulic fluid from the standby pump system being at least a predetermined minimum value.

19. An apparatus, as set forth in claim 17, wherein the switch is enabled in response to an operator holding the switch in an on position, and disabled in response to the operator releasing contact with the switch.

20. A method for preparing a hydraulic work machine for towing in response to a dead engine condition, including the steps of:

depressing a switch to activate a standby pump system;

activating a motor in response to depressing the switch;

activating a hydraulic pump in response to activating the motor;

enabling a plurality of electrohydraulic pilot controls in response to depressing the switch;

controllably lifting an implement as a function of the switch being depressed and in response to engaging a hydraulic implement lift control lever; and controllably releasing a set of brakes as a function of the switch being depressed and in response to engaging a brake release lever.

21. A method, as set forth in claim 20, wherein controllably lifting an implement includes the steps of:

delivering hydraulic fluid to a head end of a hydraulic lift cylinder; and releasing hydraulic fluid from a rod end of a hydraulic lift cylinder.

22. A method, as set forth in claim 20, wherein controllably releasing a set of brakes includes the step of delivering hydraulic fluid to a hydraulic brake system.

* * * * *